(12) United States Patent
Clements

(10) Patent No.: US 6,238,158 B1
(45) Date of Patent: May 29, 2001

(54) HUB RETENTION FOR LUG NUT COVERS

(75) Inventor: Roger F. Clements, Hudson, OH (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 09/533,297

(22) Filed: Mar. 22, 2000

Related U.S. Application Data
(60) Provisional application No. 60/125,447, filed on Mar. 22, 1999.

(51) Int. Cl.$^7$ .............................. F16B 33/00; F16B 37/14
(52) U.S. Cl. ..................... 411/431; 411/372.6; 411/373; 411/910
(58) Field of Search ................................ 411/372, 372.5, 411/372.6, 373, 377, 374, 431, 910

(56) References Cited

U.S. PATENT DOCUMENTS

| | | |
|---|---|---|
| D. 350,524 | 9/1994 | Bias ..................... D12/213 |
| 2,018,301 | 10/1935 | Ferry . |
| 2,095,289 | 10/1937 | Rosenberg . |
| 2,103,743 | 12/1937 | Doty .................... 292/327 |
| 2,538,483 | 1/1951 | Summers . |
| 3,135,558 | 6/1964 | Johnston, Jr. et al. ............... 301/37 |
| 3,241,427 | 3/1966 | Bosler . |
| 3,364,806 | 1/1968 | Chaivre . |
| 3,485,134 | 12/1969 | Ott . |
| 3,548,704 | 12/1970 | Kutryk . |
| 4,324,516 | 4/1982 | Sain et al. .................... 411/5 |
| 4,521,146 | 6/1985 | Wharton ..................... 411/1 |
| 4,557,654 | 12/1985 | Masuda et al. ................. 411/431 |
| 4,582,462 | 4/1986 | Thiel ...................... 411/371 |
| 4,632,465 | 12/1986 | Cummings ................... 301/108 |
| 4,659,273 | 4/1987 | Dudley ..................... 411/373 |
| 4,764,070 | 8/1988 | Baltzell et al. ............... 411/430 |
| 4,775,272 | 10/1988 | Toth ...................... 411/429 |
| 4,784,555 | 11/1988 | Cantrell .................... 411/431 |
| 4,787,681 | 11/1988 | Wang et al. ................. 301/375 |
| 4,824,305 | 4/1989 | McCauley .................. 411/431 |
| 4,887,950 | 12/1989 | Sakayori et al. ................ 411/302 |
| 4,890,967 | 1/1990 | Rosenbaum .................. 411/372 |
| 4,907,929 | 3/1990 | Johnston, Jr. ................. 411/431 |
| 5,048,898 | 9/1991 | Russell .................... 301/37 S |
| 5,082,409 | 1/1992 | Bias ...................... 411/431 |
| 5,163,797 | 11/1992 | Patti ...................... 411/431 |
| 5,193,884 | 3/1993 | Sheu et al. .................. 301/37.37 |
| 5,297,854 | 3/1994 | Nielsen et al. ............... 301/37.37 |
| 5,350,266 | 9/1994 | Espey et al. ................. 411/431 |
| 5,364,213 | * 11/1994 | Teramura ................... 411/431 |
| 5,380,070 | 1/1995 | FitzGerald .................. 301/37.37 |
| 5,590,992 | 1/1997 | Russell .................... 411/431 |
| 5,707,113 | 1/1998 | Russell .................... 301/37.37 |
| 5,772,377 | 6/1998 | Bydalek .................... 411/429 |
| 5,810,532 | 9/1998 | Huang ..................... 411/431 |
| 5,842,749 | 12/1998 | DiMarco ................... 301/37.37 |
| 5,857,818 | 1/1999 | Bias, Sr. ................... 411/431 |

FOREIGN PATENT DOCUMENTS

| | | | |
|---|---|---|---|
| 804 736 | 7/1949 | (DE) . | |
| 2531155 | * 2/1984 | (FR) ..................... 411/431 |
| 2 595 125 | 9/1987 | (FR) . | |
| 23512 | 2/1913 | (GB) . | |
| 1239839 | 7/1971 | (GB) ..................... F16B/37/04 |
| 1 536 598 | 12/1978 | (GB) . | |
| 9207198 | 4/1992 | (WO) .................... F16B/37/14 |
| 9729289 | 8/1997 | (WO) .................... F16B/37/14 |

* cited by examiner

*Primary Examiner*—Neill Wilson
(74) *Attorney, Agent, or Firm*—Gary P. Topolosky

(57) ABSTRACT

A cover for a bolt and an annular nut having a plurality of generally planar, side surfaces. The cover includes: a shell having a closed end portion and a plurality of side surfaces extending downwardly from the closed end portion, an interior portion of said side surfaces being threaded; and a clip for inserting into the aforementioned shell. The clip includes an annular ring and a plurality of spaced projections extending downwardly from the ring, each projection having exterior threads for engaging with the threaded interior of the shell. Preferably, interior portions of each downward clip projection has a substantially planar surface for engaging with the sides of a lug nut over which this cover is installed.

22 Claims, 3 Drawing Sheets

HUB RETENTION FOR LUG NUT COVERS

CROSS REFERENCE TO RELATED APPLICATIONS

This application claims the benefit of U.S. Provisional Application Ser. No. 60/125,447, filed on Mar. 22, 1999, the disclosure of which is fully incorporated by reference herein.

FIELD OF THE INVENTION

This invention relates to vehicular wheel accessories. More particularly, this invention relates to protective caps for covering the lug nut and bolt (or stud) that is used to attach a wheel rim to a car, truck, bus or the like. The invention further relates to an improved means for retaining or securing such lug nut covers to the lug and nut assembly over which they are typically installed. It represents an improvement over the lug nut covers of the prior art, including but not limited to those covers disclosed and claimed in U.S. Pat. No. 5,082,409, Design Patent No. 350,524, and U.S. Pat. No. 5,590,992.

TECHNOLOGY REVIEW

Numerous types of lug nut caps or covers have been developed over the years. Many caps are designed to prevent corrosion of the vehicular wheel parts which they cover. Other covers prevent unauthorized tampering with or removal of the lug nuts which secure a wheel rim on a vehicle. Still other covers serve a purely decorative or ornamental function.

In U.S. Pat. No. 2,018,301, there is shown a domed cap made from rustproof metal. The base of this cap includes an inwardly extending flange for permanently securing onto a vehicular lug nut during final die forming. U.S. Pat. No. 2,095,289 shows a lug nut cap having a base portion which seats flush with the top of a nut secured on a threaded bolt. The domed body of this cap covers only that section of bolt protruding outwardly beyond the nut. The domed body includes prongs, or a separate clip, for engaging the threads of the bolt section covered by this cap. In U.S. Pat. No. 3,135,558, there is claimed a unitary wheel cover comprised of five unthreaded cap members disposed in a circular array with spring-like means connecting adjacent cap members. The capped wheel nut of U.S. Pat. No. 3,364,806 includes a conical base for seating in a depression on the axle hub of an automobile. The wheel nut, itself, is permanently encased in its own corrosion-resistant cover.

U.S. Pat. No. 3,548,704 shows a protective cap having a closed end with inwardly projecting ribs for engaging the threads of a bolt or stud. These ribs prevent dislodging of the cap by axial movement. In U.S. Pat. No. 4,582,462, there is claimed a plastic cap for protecting a polygonal lug nut assembly. The inner face of this cap includes two sets of axial profile webs, one set adapted for sliding the cap over a hexagonal nut during installation; the other set adapted for frictionally locking the cap onto its hexagonal nut.

In U.S. Pat. No. 4,632,465, there is shown a plurality of knob fittings for covering nuts of a hub cap mounted on the recessed, drive axle wheels of a truck or bus. These knob fittings snap mount directly over the lug nuts which they cover. U.S. Pat. No. 4,659,273 claims an attachment for detecting removal of the wheel nut covered by this attachment. An internally-threaded member secures an outer shroud of this attachment to a vehicular bolt or stud. The capped wheel nut of U.S. Pat. No. 4,764,070 secures to the outside of a vehicular lug nut using silicon-based adhesives. Such adhesion avoids the corrosion that occurs at the weld points of prior lug nut assemblies.

U.S. Pat. No. 4,775,272 shows a representative "long style" wheel nut cap. The sheet metal exterior of this cap welds to the lower edge of a hexagonal nut for preventing moisture from entering the cap. The protective nut cap of U.S. Pat. No. 4,784,555 includes a radially-disposed, continuous groove along the lower edge of its inner surface. An elastomeric member, or O-ring, rests in this groove for engaging the angled points of the lug nut covered thereby. The locking nut cover of U.S. Pat. No. 4,824,305 includes a stainless steel outer shell, a hexagonal head portion with a plurality of square lugs extending inwardly from this head portion, a smaller, integrally-formed cylindrical portion, and a molded plastic insert with spaced depressions for receiving the hexagonal head portion.

SUMMARY OF THE INVENTION

It is a principal objective of this invention to provide a vehicular lug nut cover which can be easily installed and removed but more readily secured than some of the prior art lug nut cover assemblies described above. Like many of its predecessors, the cover assembly of this invention needs no special tools, such as a hammer, to install over the lug nut secured on a threaded bolt or stud. Nor does this cover need any specific puller to remove it from the bolt and nut combination over which it is installed. The invention may be snap fitted over and removed from most any vehicular lug nut by hand.

It is another objective to provide a cover that fits snugly against the sides of any lug nut over which it is installed so as to not dislodge under normal driving conditions. To achieve a snug fit, the invention includes a clip having a plurality of projections, each with a plurality of threadings for engagement with the threaded inner walls of this cover's outer shell. The interiors of this clips projections contact with the annular side surfaces of the lug nut over which the clip and cover are installed.

It is yet another objective to provide a lug nut cover which requires no contact with the bolt, especially the bolt threads, over which the cover is installed. The securement means for this invention is not contingent upon gripping any portion of the bolt extending through the secured lug nut. In fact, the outer shell of this cover makes no direct contact with the lug nut over which it is installed. Only the clip of this invention is interposed between its outer shell and the lug nut covered thereby.

In one preferred embodiment of this invention, the outer lug nut cover seats flush with a generally flat surface of the wheel rim when installed. Such flush contacting inhibits dirt, road salt and other elements from getting beneath the cover and rendering the bolt and lug nut therebeneath more susceptible to corrosion or other damage. Once installed, the invention completely covers the bolt hole extending through the wheel rim for reducing the possibility of exposing any of the brake, steering and other wheel assembly parts over which the vehicular rim is mounted.

It is yet another objective to provide a lug nut cover which includes a chrome-plated plastic, outer shell. The configuration of this shell is designed for easy manufacture through known injection molding processes. With an outer plating of chrome applied to this shell, wheel accessory maintenance has been simplified. Past lug nut covers made of aluminum, steel or other metals required periodic polishings to maintain their luster. In some instances, these covers had to be fully removed for cleaning and/or polishing. Because some prior art caps required special tools for installation and/or removal, general maintenance was even more complicated. The chrome-plated shells of this invention, on the other hand, wash clean with soap and water. No special polishing procedures are needed. With a plastic underlayment, these shells are also less susceptible than their metal counterparts to minor dents and pings. The chrome-plated shells of this invention enhance the appearance of most forged aluminum alloy wheels, such as those used on light trucks, heavy load trucks and buses. These same shells also improve the aesthetics of steel wheel rims, painted or otherwise.

It is another objective of this invention to provide a polymeric clip for inserting into the shell of a removable lug nut cover, said clip being easily inserted a predetermined distance into the shell. This clip contains a plurality of projections for fitting over the bolt and lug nut onto which the cover of this invention is installed. Each outer projection of this clip is threaded to correspondingly seat in the threaded regions on the interior of the cover outer shell.

In accordance with the foregoing objectives and advantages, there is provided a cover for a bolt and an annular nut having a plurality of generally planar, side surfaces. The cover comprises a shell including a closed end portion and a plurality of side surfaces extending downwardly from the closed end portion, said side surfaces defining a generally hollow, cylindrical cavity. The interior portions of these side surfaces are threaded for receiving the clip retention means described below.

The cover further includes a clip for inserting into the aforementioned shell cavity. This clip includes an annular ring and a plurality of spaced projections extending downwardly from the ring, each projection having exterior threads for engaging with the cover's outer shell. The interior portions of these same projections include a substantially smooth inner surface that is meant to engage with the side surfaces of the lug nut over which this cover is installed. On a preferred basis, the outer shell of this cover is made from a chrome-plated plastic while the clip made from a polymeric material.

BRIEF DESCRIPTION OF THE DRAWINGS

Further features, objectives and advantages of the present invention will be made clearer with the detailed description of preferred embodiments made with reference to the drawings in which.

DETAILED DESCRIPTION OF PREFERRED EMBODIMENTS

Key features of this invention include: (A) an internally threaded, flanged nut cover; and (B) an externally threaded, preferably six fingered (or projection) clamp retention means, preferably made from a heat resistant, glass reinforced plastic.

Advantages of this invention include, but are not limited to: better hub cover retention in instances where these lug nut covers are used to hold in place a central hub cover; greater security by making it more difficult to steal the hub and lug nut covers from a parked vehicle; and a reduced number of parts for hub pilot wheel systems by greater interchangeability with the present invention.

The new system was designed to improve retention of the nut cover on the nut so making it more difficult to remove. Prior art, clip held lug nut cover assemblies have been known to loosen over time during operation causing the cover system to rattle and sometimes detach. The screw held, lug nut cover retention systems are dependent on having the correct number of good bolt or stud threads engage with the nut cover itself. Any damage to the threads in the nut cover may result in inconsistent clamping of the nut cover which again could lead to ratting and, in extreme cases, detachment. Nut cover thread damage may be caused by overtightening or overheating and could also be the result of damage to the stud thread. Insufficient thread engagement may also make the nut cover easier to remove.

The improved design of this invention uses an internal thread in the nut cover which is screwed onto an externally threaded, at least three-fingered but more preferably six fingered, clamp. The tapered fingers of this clamp tighten onto the hexagon of the nut as the nut cover is screwed down or over the lug and nut assembly of a vehicle wheel. The flange portion of the nut cover may be further used to hold a central hub cover to the same wheel.

Figure 5:
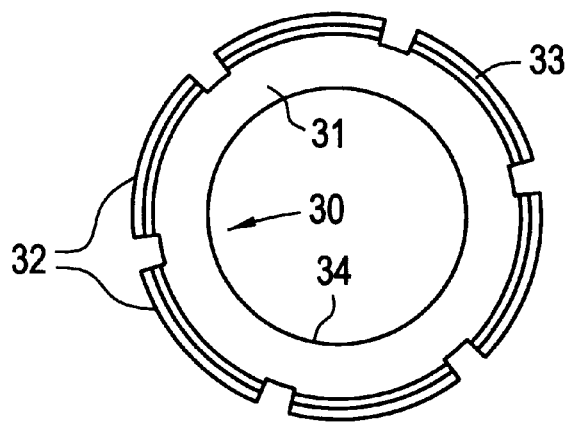
FIG. 5 is a top view of the clip retention means of FIG. 4.
Figure 6:
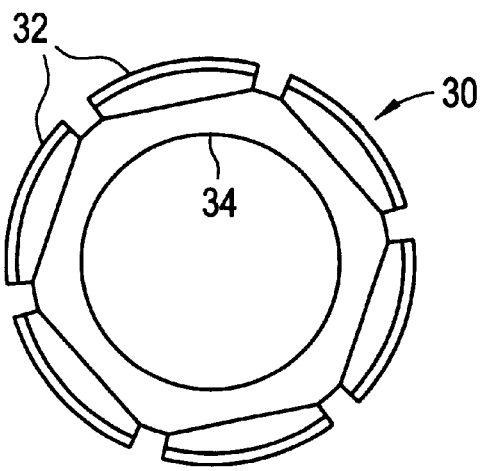
FIG. 6 is a bottom view of the clip retention means of FIG. 4.
Figure 7:
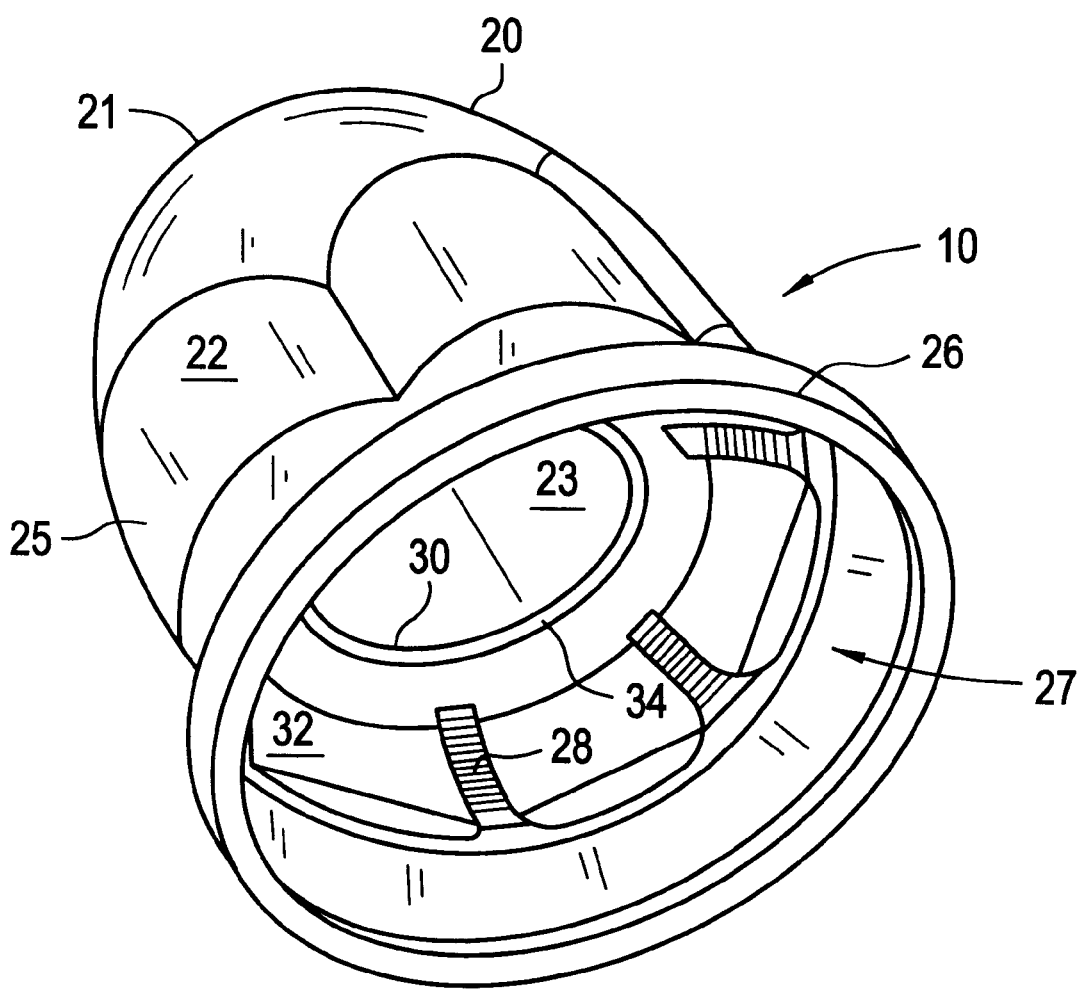
FIG. 7 is a perspective view of the clip retention means inserted into the lug nut cover outer shell according to one preferred embodiment of this invention.

Referring now to FIGS. 1–7, there is generally shown a two-piece lug nut cover 10, best seen assembled and in a perspective view at accompanying FIG. 7. This cover is comprised of a first main piece, plastic outer shell 20 (see FIGS. 1–3); and a spring-like clip 30 for inserting into shell 20 (see FIGS. 4–6). The latter clip includes threaded means for retaining clip 30 within outer shell 20. The cover of this invention typically installs over a threaded, vehicle wheel stud or bolt and its correspondingly threaded nut, neither of which are depicted herein. The latter nut typically has a plurality of generally planar, annular surfaces with which the clip portion 30 of this invention will make contact.

When cover 10 is installed over a secured nut and bolt, it is a principal objective that this invention substantially cover and minimize any exposure of the hole in wheel rim through which the lug bolt passes. In the accompanying FIGURES, both outer shell 20 and inner clip 30 are six-sided for fitting over the types of hexagonal lug nuts used to secure most wheel rims to an automobile, truck or bus. It is to be understood, however, that this same invention may be modified to cover other polygonal nuts, i.e. those which are other than six-sided. For example, an outer shell with four-sides could be constructed to cover a generally square nut. And an octagonal shell and clip could be made to fit over an octagonally-shaped nut. In any event, at least cover 20, and preferably clip 30, of this invention are intended to have the same number of side surfaces as the number of annular surfaces on the nut over which the cover assembly will be installed.

Figure 1:
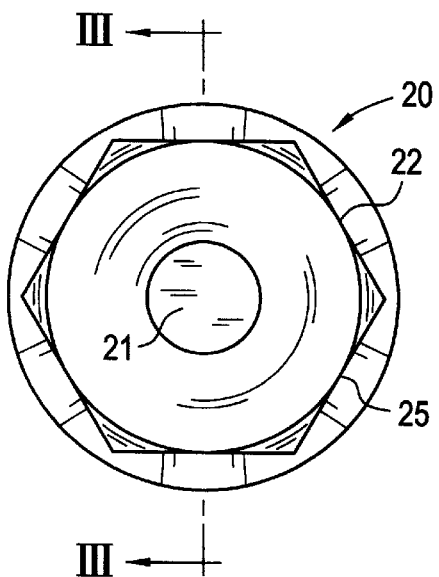
FIG. 1 is a top view of a representative lug nut cover outer shell according to this invention.
Figure 2:
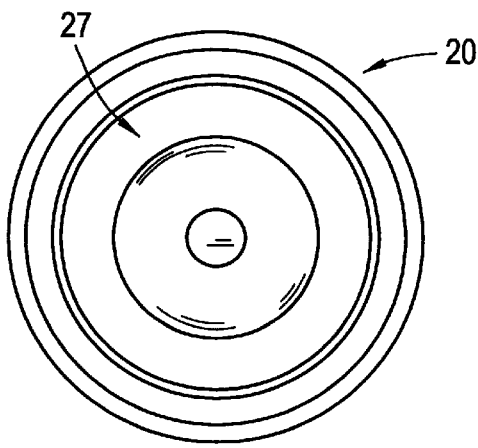
FIG. 2 is a bottom view of the lug nut cover outer shell of FIG. 1.
Figure 3:
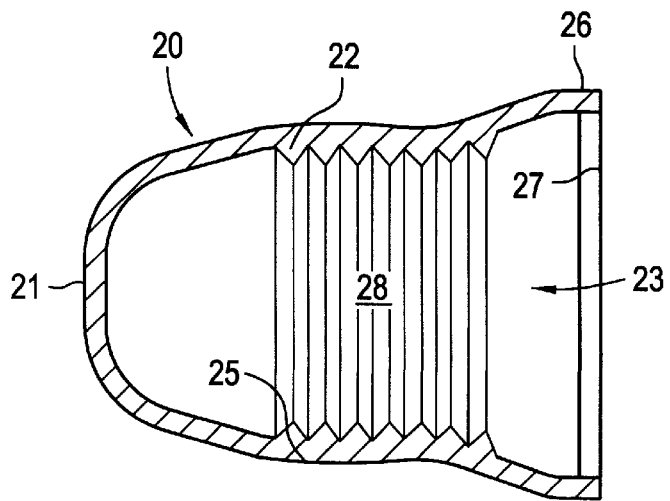
FIG. 3 is a side, cross sectional view of the lug nut cover outer shell taken along lines III—III of FIG. 1.

In FIGS. 1–3, one preferred configuration for shell 20 is shown in a top (FIG. 1), bottom (FIG. 2) and side (FIG. 3) view. This shell includes a closed end portion 21, which is preferably hemispherical or dome-shaped; and a plurality of side surfaces 22 extending downwardly from end portion 21.

These side surfaces connect along adjacent lateral edges to define a hollow, generally cylindrical cavity 23. This cavity and the domed area beneath end portion 21 are designed to accommodate any portion of a lug bolt that extends outwardly beyond the nut secured thereon. The cover of this invention does not require any contact with the threads of that bolt, however.

Each side surface 22 of shell 20 has an inner wall 24 and outer wall 25. In the accompanying FIGURES, both inner walls 24 and outer walls 25 are generally planar. These same outer walls may be modified, with or without modification to end portion 21, to provide a cover which: is more bullet-shaped; has a somewhat spherical exterior; is cylindrical and flat-topped; or which is more customized in appearance.

Each shell inner wall 24 terminates in a base or bottom wall 26 to define an open shell end 27 opposite end portion 21. These shell inner walls are provided with threads 28 for engagement with the correspondingly sized and shapes threads of the protrusions from clip 30 described in more detail below. The shell bottom walls 26 are preferably planar for seating flush against a flat surface of a wheel rim when the cover is installed over a bolt and nut assembly. Alternately, bottom walls 26 may fully or partially contact, or come substantially near exterior, peripheral portions of a central hub cover (not shown) for holding said cover, at least in part, to the wheel.

Figure 4:
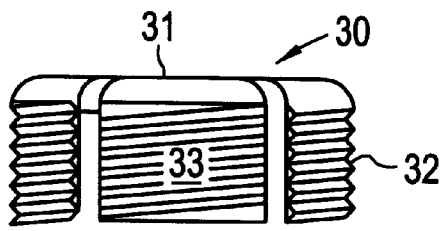
FIG. 4 is a side view of a preferred clip retention means for inserting into the lug nut cover outer shell according to this invention.

From FIGS. 4–6, there is shown one preferred embodiment of clip 30 in a side (FIG. 4), top (FIG. 5) and bottom (FIG. 6) view focus. This clip 30 comprises an annular ring 31 from which a plurality of projections 32 downwardly extend. Each of these projections are outwardly threaded 33 along a significant portion of their outer walls for engaging with the interior, threads 28 of shell 20 when the entire assembly of this invention is installed over a vehicle wheel lug nut and bolt assembly. On a preferred basis, the annular ring is generally circularly shaped and has a central aperture 34 through which may pass (without contact) some portion of a lug bolt extending outwardly beyond its securing nut. And while the clip 30 of FIGS. 1–7 is shown to have six downwardly extending projections 32 for use with a six-sided lug nut, it is understood that a fewer number of projections, such as three descending downwardly from alternating regions of ring 31, or perhaps four outwardly threaded fingers or projections may extend downwardly therefrom. For alternately sized and shaped polygonal lug nut covers, it is preferred that their clips include a corresponding number of projections to the number of nut sides in eventual contact therewith, but it is understood that a fewer number of such projections may also suffice.

In less preferred, alternate embodiments, a clip (not shown) may include more than one finger-like projection for each corresponding side of the clip so that multiple contact areas engage with the threaded interior to shell 20. Still other modifications to the spring-like projections of this clip are anticipated by this invention.

Preferably, the shell portion of cover 10 is made from a virgin thermoplastic (i.e., not remelted), most preferably from an acrylonitrile-butadiene-styrene (ABS) resin. One representative ABS resin for making shell 20 is sold by Borg-Warner under the trademark CYCOLAC®. This material can be injection molded into the aforementioned shell configurations. After injection molding has been completed, the entire exterior of plastic shell 20 is electroplated according to well-known copper-nickel-chromium type techniques. With such plating, the aesthetics of this plastic shell are improved while rendering the cover more resistant to dents and pings. A chrome-plated, plastic shell is also more easily cleaned to a fine luster than its all-metal counterparts. Road grime can be easily removed therefrom using soap and water, without any hand polishing.

The clip 30 for inserting into shell 20 is preferably made from a heat resistant, and more preferably glass-reinforced resin material. It is also conceivable that said clip could also be made from a durable, yet ductile material selected from aluminum, steel, brass, and combinations thereof.

Because of the general configuration of clip 30 and shell 20, preferred embodiments of this invention may not be made to fit universally over every vehicular lug nut. It is to be understood, however, that cover 10 may be made in various sizes, shapes and configurations to accommodate the lug nuts of numerous vehicles. Many of the covers depicted hereinabove install the 1½ inch hex head lug nuts used for mounting wheel rims on nearly all class 7 and 8 highway trucks, plus many more class 6 trucks and trailers, class A motor homes and commercial buses. The two-piece covers of this invention may be sold individually, or in sets. They may also be sold unassembled (i.e. in pieces) or preferably fully assembled, that is, with the clips 30 inserted into cavities 23 of each shell 20. When installing each cover over a lug or bolt and nut assembly, it is preferred that the covers be placed over an installed nut (perhaps further over the edge of a central wheel hub as well), then hand screwed on. Eventually, either the clip portion of this assembly will reach its maximum depth into the cavity of shell 20, or the lowest most edge of this shell will fully or partially contact with the wheel (or central wheel hub) so that no further cover assembly tightening takes place. Alternately, and less preferably, the clips of each assembly may be snapped onto the nuts of each lug and nut assembly over which this invention will be installed before each corresponding shell 20 is screwed onto each such clip 30. Despite such easy installation and removal practices, the cover of this invention has been shown to remain affixed to the vehicular lug nut over which it is installed under normal driving conditions.

Having described the presently preferred embodiments, it is to be understood that the invention may be otherwise embodied within the scope of the appended claims.

What is claimed is:

1. A two-piece cover for a bolt and nut assembly which when installed covers a substantial portion of the nut of said assembly, said cover comprising:
   (a) a shell including: a closed end portion; and a plurality of side surfaces extending downwardly from the closed end portion for defining a generally hollow cavity that will cover a substantial portion of the nut of said assembly, at least half of said side surfaces having a threaded interior portion protruding into the cavity from said side surfaces; and
   (b) a clip including: an annular ring; and a plurality of spaced projections extending downwardly from the ring, each projection having a threaded exterior portion for engaging with the threaded interior portions of the shell side surfaces when the cover is installed over the bolt and nut assembly.

2. The cover of claim 1 wherein the closed end portion is substantially dome-shaped.

3. The cover of claim 1 wherein the nut of said assembly is hexagonal and the clip has at least three outwardly threaded projections extending downwardly from the ring.

4. The cover of claim 3 wherein the clip includes a plurality of opposing pairs of outwardly threaded, downwardly extending projections.

5. The cover of claim 4 wherein the clip has six outwardly threaded projections extending downwardly from the ring.

6. The cover of claim 3 wherein each downwardly extending projection from the clip has a substantially planar, inner wall portion for contacting with the sides of a nut over which the cover is installed.

7. The cover of claim 1 wherein the shell terminates in a bottom wall section for contacting a vehicle wheel or central wheel hub assembly.

8. The cover of claim 7 wherein the bottom wall section of said shell is substantially planar.

9. The cover of claim 1 wherein the shell is made from a chrome-plated plastic and the clip is made from a material selected from the group consisting of: plastic, aluminum steel, brass, and combinations thereof.

10. A cover adapted for installing over a threaded bolt and polygonal nut assembly and substantially covering the nut of said assembly when installed thereover, said nut having a plurality of generally planar, annular surfaces, a plurality of such assemblies being used for mounting a rim to a vehicle, said cover comprising:
  (a) a shell including: a closed end portion; and a plurality of side surfaces extending downwardly from the closed end portion for defining a generally hollow cavity, at least half of said side surfaces having a threaded interior portion protruding into the cavity from said side surfaces; and
  (b) a clip including: an annular ring; and at least three spaced apart projections extending downwardly from the ring, each projection having a threaded exterior portion for engaging with the threaded interior portions of the shell side surfaces when the cover is installed over the bolt and nut assembly.

11. The cover of claim 10 wherein each of the side surfaces of the shell has a threaded interior portion protruding into the cavity.

12. The cover of claim 10 wherein the clip has at least four outwardly threaded projections extending downwardly from the ring.

13. The cover of claim 12 wherein the clip has six outwardly threaded projections extending downwardly from the ring.

14. The cover of claim 10 wherein each downwardly extending projection has a substantially planar, inner wall portion for contacting with the sides of the polygonal nut over which the cover is installed.

15. The cover of claim 10 wherein the shell terminates in a bottom wall section for contacting a vehicle wheel or central wheel hub assembly.

16. The cover of claim 15 wherein the bottom wall section of said shell is substantially planar.

17. The cover of claim 10 wherein the shell is made from a chrome-plated plastic and the clip is made from a material selected from the group consisting of: plastic, aluminum, steel, brass, and combinations thereof.

18. The cover of claim 17 wherein the clip is made from plastic.

19. A clip adapted for inserting a predetermined depth into an internally threaded, dome-shaped lug nut cover, said clip adapted for removably installing said dome-shaped cover over a substantial portion of the nut to a threaded bolt and lug nut combination for mounting a wheel rim on a vehicle, said clip comprising:
  an annular ring; and
  a plurality of spaced projections extending downwardly from said ring, each projection having a threaded exterior portion for engaging with the threaded interior of said dome-shaped cover when it is installed over the bolt and lug nut combination.

20. The clip of claim 19 wherein the annular ring and downward projections are integrally formed.

21. The clip of claim 19 which is made from a material selected from the group consisting of: plastic, aluminum, steel, brass, and combinations thereof.

22. The clip of claim 21 which is made from plastic.

* * * * *